March 3, 1942.   R. SARDESON   2,274,810
FOOD COOKING DEVICE
Filed Oct. 1, 1938   3 Sheets-Sheet 1

Inventor
Robert Sardeson
By Caswell & Lagaard
Attorneys

March 3, 1942.   R. SARDESON   2,274,810
FOOD COOKING DEVICE
Filed Oct. 1, 1938   3 Sheets-Sheet 2
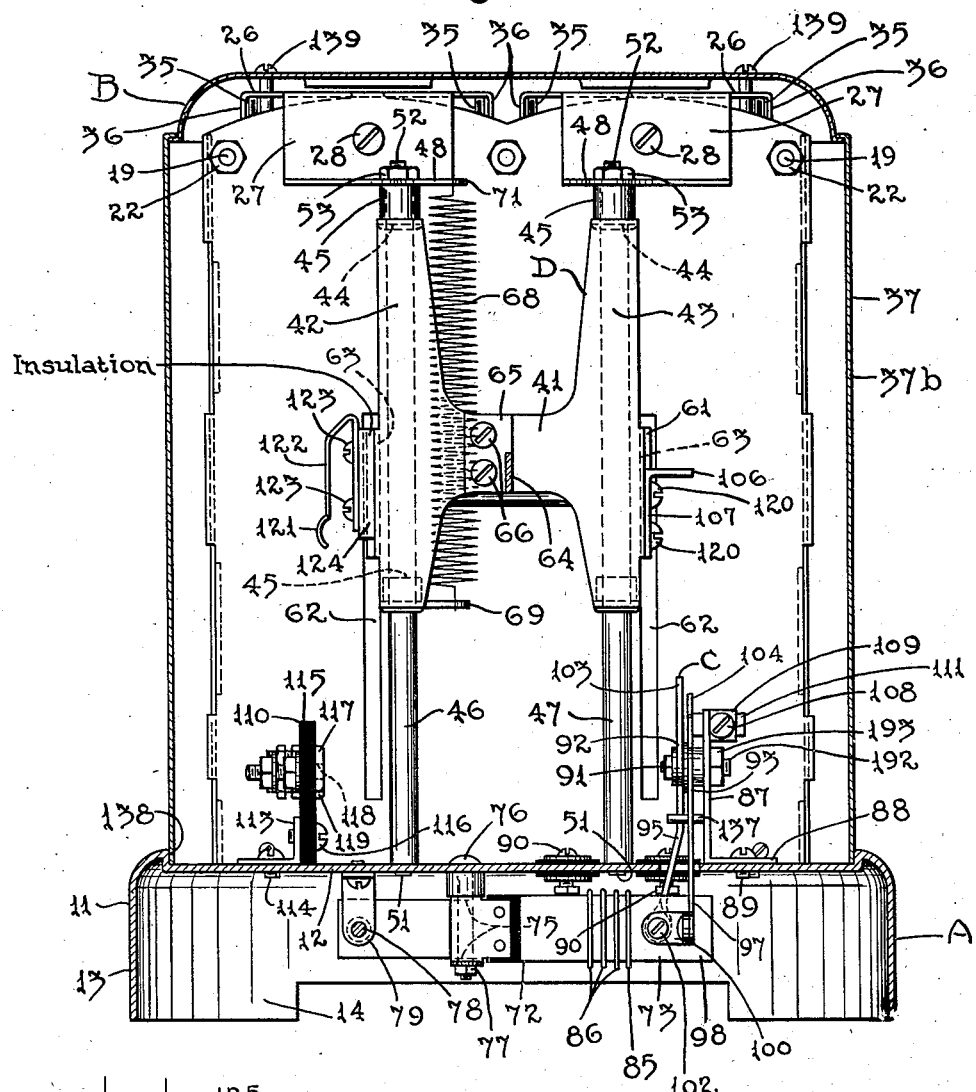

March 3, 1942.    R. SARDESON    2,274,810
FOOD COOKING DEVICE
Filed Oct. 1, 1938    3 Sheets-Sheet 3
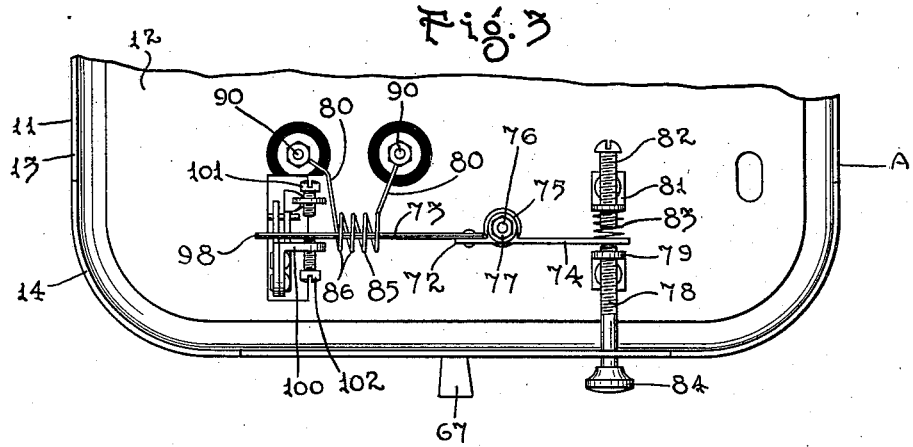
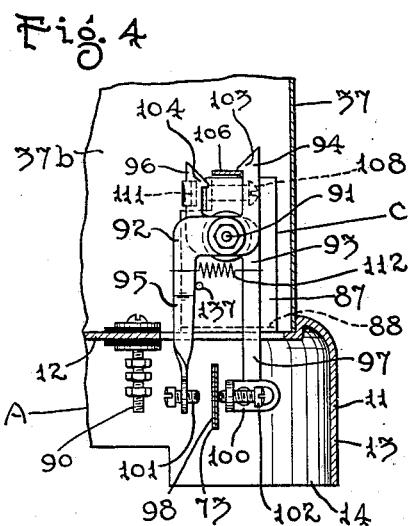
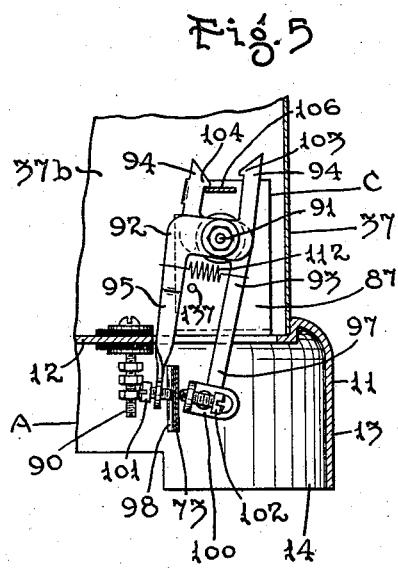
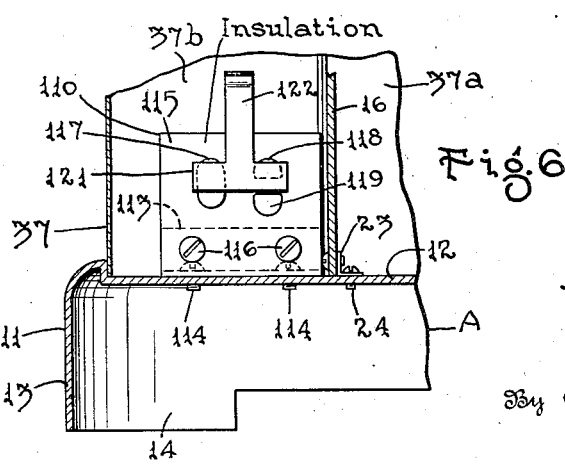
Inventor
Robert Sardeson
By Caswell & Lagaard
Attorneys Patented Mar. 3, 1942

2,274,810

UNITED STATES PATENT OFFICE 2,274,810

FOOD COOKING DEVICE

Robert Sardeson, Minneapolis, Minn., assignor to Harold C. Genter, Miami Beach, Fla.

Application October 1, 1938, Serial No. 232,707

11 Claims. (Cl. 219—19)

My invention relates to food cooking devices and to operating mechanisms and timing mechanisms therefor and has for an object to provide a device which will be simple in construction and positive in action.

Another object of the invention resides in providing a device which utilizes a thermally responsive member for procuring timing of the cooking operation.

A further object of the invention resides in providing a device in which timing is procured during the first operation by heating of the thermally responsive member and during subsequent operations by successive cooling and heating of the thermally responsive member.

A still further object of the invention resides in constructing the food cooking device with food shifting means and in controlling the energization of the heating means for the cooking device and the heater for the thermally responsive member through said food shifting means.

A feature of the invention resides in providing a food cooking device having food shifting means adapted to occupy two or more positions when the food is in proximity to the heating means and in controlling the timing of the cooking device through the positions of said food shifting means.

Another object of the invention resides in controlling the energization of the heater and heating means through the positions of said food shifting means.

Another object of the invention resides in providing an operating mechanism including a timing mechanism and a movable member adapted to occupy two or more positions and in controlling the timing of the timing mechanism through the positions occupied by said movable member.

Other objects of the invention reside in the novel combination and arrangement of parts and in the details of construction hereinafter illustrated and/or described.

In the drawings:

Fig. 2 is an elevational sectional view taken on line 2—2 of Fig. 1.

Fig. 3 is an inverted view of a portion of the invention disclosed in Fig. 1.

Fig. 4 is a fragmentary elevational sectional view taken on line 4—4 of Fig. 1.

Fig. 5 is a view similar to Fig. 4 showing the parts in altered position.

Fig. 6 is an elevational sectional detail view taken on line 6—6 of Fig. 1.

Fig. 7 is a wiring diagram of the invention.

Figure 1:
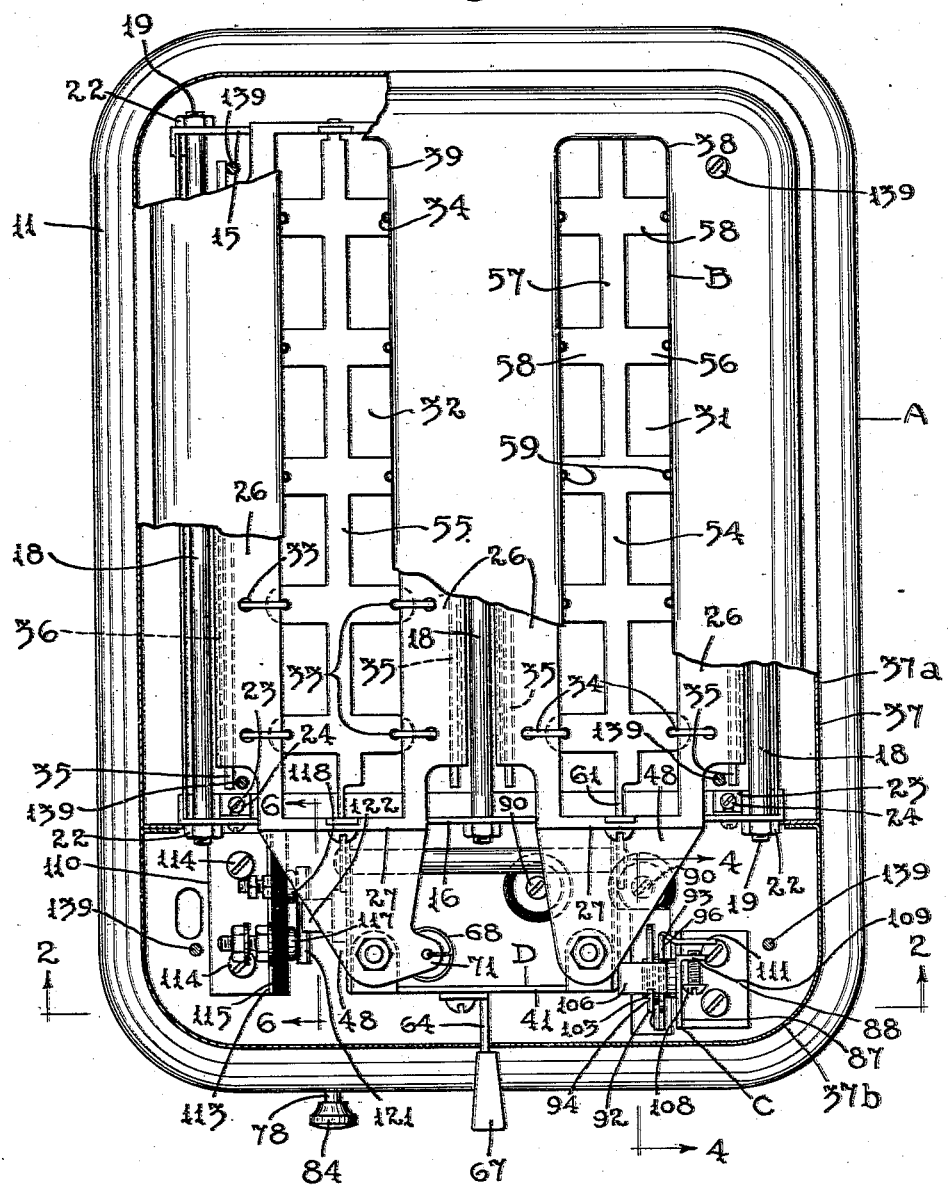
Fig. 1 is a plan view of a bread toaster with a portion thereof cut away and illustrating an embodiment of my invention.

My invention comprises a frame A, best shown in Fig. 1. This frame carries, at one portion of the same, a toaster B and at another portion of the same a timing device C for timing the operation of the toaster. The toaster B includes a carriage D having suitable bread racks on which the bread is carried and which are adapted to be lowered into the toasting ovens and to positions adjacent the heating elements of the toaster and to be raised from the positions adjacent said elements to elevated positions remote therefrom when the toasting operation is completed. These various parts will now be described in detail.

The frame A comprises a base 11 which may be constructed from sheet metal as a stamping and which has a body portion 12 provided with a flange 13 depending therefrom. At the corners of the flange 13 the same projects downwardly to form feet 14 by means of which the base is supported. Frame A further includes two vertically spaced plates 15 and 16 which are rigidly attached to one another by means of shouldered rods 18. These rods are formed with threaded reduced ends 19 which pass through the said plates and which have screwed upon the ends thereof nuts 22. By means of this construction the respective plates are held in proper spaced relation and are attached to one another. The assembly of plates thus formed is secured to base 11 by means of clip angles 23 which are secured to the body 12 through bolts 24.

The toaster B is constructed in the following manner: Extending across the two plates 15 and 16 are a number of supporting bars 26 which have flanges 27 overlying said plates and secured thereto by means of screws 28. These bars are spaced apart to form the toasting ovens which, in the particular toaster illustrated, are two in number and designated by the reference numerals 31 and 32. The bars 26 are drilled at suitable intervals, as designated at 33, to receive guard wires 34 which extend downwardly from the facing marginal edges of the bars and which define the space in which the bread to be toasted is disposed. Beneath the bars 26 are situated the various heating elements 35 which heat the toast ovens 31 and 32. These heating elements are supported on the body 12 of the base 11 in any suitable manner and are held in place at their upper ends between the inner ends of the guard wires 34 and flanges 36 formed on the bars 26. A case 37 encloses the entire toaster. The case 37 is constructed in two parts 37a and 37b. The part 37a of case 37 is constructed with two openings 38 and 39 in the upper portion of the same, by means of which the bread may be inserted in the two ovens 31 and 32. The case 37 is received within a recess 138 in the base 11 and is attached thereto by means of screws 139 which extend through said case and are threaded in the base 11.

The toaster B includes the bread carriage D, previously referred to, which is best shown in Figs. 1 and 2. This carriage consists of a plate 41 which has two vertically arranged legs 42 and 43. The upper and lower ends of these legs have bent outwardly therefrom flanges 44 which have secured to them guide bushings 45. The bushings 45 are slidably mounted on two vertical posts 46 and 47 which are attached to the body portion 12 of base 11 and to two ears 48 bent outwardly from the flanges 27 of the supporting bars 26. The posts 46 and 47 are constructed with reduced ends 51 which are riveted to the base 11 and with threaded shouldered ends 52 which pass through the ears 48 and have nuts 53 screwed upon the same for clamping said posts in position.

Attached to the plate 41 is an arm 64 which has formed on it a flange 65 secured to the said plate by means of screws 66. This arm projects outwardly through the case 37 and has attached to it a finger piece 67 by means of which the said arm may be depressed. When the arm 64 is depressed, the carriage D is moved downwardly. The carriage D is returned to its uppermost position by means of a tension coil spring 68 which is hooked at one end to a lug 69 formed on the lowermost flange 44 of leg 42 and at its other end to a lug 71 issuing from the ear 48 of the bar 26 of toast oven 32.

The carriage D further includes two bread racks 54 and 55 which are disposed within ovens 31 and 32 and upon which the bread to be toasted rests. Inasmuch as both of these bread racks are identical in construction, only the bread rack 54 will be described in detail. This bread rack consists of a longitudinally extending horizontally disposed grid 56 which is formed of sheet metal stamped to provide a central supporting member 57 and laterally disposed members 58 projecting therefrom. The supporting members 58 are formed near their ends with holes 59 through which the guard wires 34 extend. Said guard wires fit loosely within the holes and are held in proper position by means of the members 58. The central supporting member 57 of the bread rack 54 has a flange 61 bent downwardly therefrom which extends through a slot 62 in the end plate 16. This flange is secured to another flange 63 bent from the plate 41. The rack 55 is constructed in the same manner and attached to the plate 41 in identically the same manner. It will thus be seen as the carriage D is raised and lowered, racks 54 and 55 are raised and lowered with it, the supporting members 56 thereof sliding along the guard wires 34 and moving the bread from positions adjacent the heating elements 35 to positions above the same and vice versa.

The timing mechanism C includes a thermally responsive member 72, best shown in Figs. 2 and 3. This thermally responsive member consists of a strip of bi-metal 73 which is riveted to an arm 74. Arm 74 has two ears 75 extending outwardly therefrom. A bolt 76 secured to the body 12 of base 11 passes through these ears and pivots the thermally responsive member for swinging movement about the said bolt as an axis. A nut 77, screwed upon the end of the bolt 76, holds the thermally responsive member in place. The arm 74 is held in adjusted position by means of an adjusting screw 78. This screw is threaded in a bracket 79 secured to the underside of the body 12 of base 11. On the other side of the arm 74 is another bracket 81 which has attached to it a similar screw 92. A compression coil spring 83 acts between the bracket 81 and the arm 74 and urges the said arm into engagement with screw 78. Screw 78 has a knob 84 which projects outwardly beyond the case and by means of which the screw 78 may be adjusted. Screw 82 limits the movement of arm 74 and at the same time forms a guide for holding the spring 83 in place.

Encircling the bi-metal strip 73, intermediate the ends thereof, is a heater 85 constructed of a coil of high resistance wire which is formed with convolutions 86 which encircle said strip and are of sufficient dimensions to permit of the desired flexure of the strip. The ends 80 of the said heater are attached under binding posts 90 which are mounted on the body 12 of base 11 and insulated therefrom. The heater is supported through the binding posts 90, the wire from which the same is constructed being sufficiently heavy to support itself when heated.

The thermally responsive member 72 of timing mechanism C operates with a construction best shown in Figs. 4 and 5. Issuing outwardly from the body 12 of base 11 is a standard 87 which is constructed from sheet metal and which is formed with a flange 88 projecting therefrom. Flange 88 is secured to the base 11 by means of machine screws 89. The standard 87 has secured to it a stud 91 which is formed with a shouldered threaded end 192 passing through said standard. A nut 193 screwed upon this end of the stud secures the same in place upon the standard. Pivotally attached to the stud 91 are two levers 92 and 93. The lever 92 is constructed with two off-set arms 94 and 95 and the lever 93 is similarly constructed with two off-set arms 96 and 97. The two arms 94 and 96 are spaced from one another and likewise the two arms 95 and 97 are spaced from one another. The two arms 95 and 97 straddle the free end 98 of the strip of bi-metal 73 and the arm 95 has a screw 101 screwed into the same. A bracket 100 attached to arm 97 has a screw 102 screwed into it. These screws are adapted to engage the strip of bi-metal 73 upon opposite sides thereof. As the bi-metal deflects in opposite directions the same engages the said screws and swings lever 92 and 93. The arm 94 has formed on the end of it a hook 103 which serves as a latch. Similarly, lever 96 has formed on the end of the same a hook 104 which also serves as a latch. Hook 103 is situated at an elevation above the hook 104. For engagement with the latches 103 and 104 a latch lug 106 is employed which is constructed of sheet metal and is formed with a flange 107 secured to the flange 63 of plate 41 by means of screws 120. This latch lug is adapted to travel past the latches 103 and 104 and when the said latches are in proper position to engage the same. A pin 137 secured to the standard 87 limits movement of the lever 92, while a screw 108 threaded in a projection 109 on standard 87 and engaging a lug 111 on lever 93 limits the movement of this lever. A tension coil spring 112 is hooked about both of the arms 95 and 97 of levers 92 and 93 and move the latches 103 and 104 toward one another. The pin 137 is so situated and the screw 108 is so adjusted that the latches 103 and 104 are in position to engage latch lug 106 when the same is moved downwardly.

For controlling the current to the heating elements 36 and the heater 85 a switch mechanism 110 is employed which is best shown in Fig. 6. Attached to the upper portion of the body 12 of base 11 is a clip angle 113 which is secured thereto by means of screws 114. An insulating plate 115 is attached to the clip angle 113 by means of screws 116. This insulating plate has secured to it three contacts 117, 118 and 119. Contacts 118 and 119 are positioned, one above the other, and the contact 117 adjacent the same. The contact 117 is of a length equal to the combined height of the two contacts 118 and 119. Cooperating with these contacts is a contactor bar 121 which is disposed at the end of a spring arm 122. Arm 122 is secured by means of screws 123 to an insulating block 124 which is attached to the flange 63 of leg 42 of plate 41. This contactor bar is adapted to connect contacts 117 and 118 together when the carriage D is held in latched position by means of latch 103. The said contactor bar is adapted to connect contact 117 with contact 119 when the carriage D is held in latched position by means of latch 104.

The various heating elements and the heater of the invention are connected in a circuit shown in detail in Fig. 7. For energizing the circuit two leads 125 and 126 are employed which are connected to a suitable source of electric current either alternating or direct. All of the heating elements 36 are connected in series and to the lead 125. The other lead 126 is connected to the contact 117. The heating elements 36 are further connected by means of a conductor 127 to the heater 85. Heater 85 is connected by means of a conductor 128 to contact 118. A conductor 129 connects contact 119 with the conductor 127.

The operation of the invention is as follows: When the toaster is cold the parts are in the various positions shown in Figs. 2 and 3. It will be noted that in such positions the carriage D is in its uppermost position and the latch 103 is in the position to engage the latch lug 106. While so disposed lever 92 is up against the stop 107 and screw 102 of lever 93 is in engagement with the thermally responsive member 72. Due to the fact that the bi-metal strip 73 is cold, lever 92 is held so that latch 104 is out of the path of movement of the latch lug 106. If the carriage D is now depressed by exerting downward pressure on the finger piece 67 the carriage D descends in opposition to the spring 68 past both latches 103 and 104. Upon release of pressure, lug 106 passes latch 104 but is engaged by latch 103 of lever 92. The parts then become arranged as shown in Fig. 4. While the carriage D was in its uppermost position connector bar 121 was free from the switch contacts and the circuit through both the heater 85 and heating elements 36 were open. When the carriage D is disposed, as shown in Fig. 4, connector bar 121 connects the two contacts 117 and 118 together. An examination of Fig. 7 will reveal that a circuit is now completed through the heater 85 and the heating elements 36 which are disposed in series in said circuit. This procures toasting of the bread within the ovens 31 and 32 and at the same time causes the strip of bi-metal 73 to become arched and to deflect. The end 98 of the strip of bi-metal moves toward the screw 101 on lever 92. As soon as the bi-metal strikes this lever, latch 103 is disengaged from the latch lug 106 and the carriage D is released. This causes the bread racks 54 and 55 to raise upwardly and to move the bread out of the ovens 31 and 32. At the same time connector bar 121 leaves the switch contacts and all circuits are again open. As the strip of bi-metal 73 leaves the screw 102, lever 93 swings in a clockwise direction as viewed in Fig. 4 and catch 104 is brought into position to be engaged by the latch lug 106. The position of the various parts, after the carriage D has been released, is shown in Fig. 5.

If a second slice or slices of bread are inserted into the ovens and deposited upon the bread racks 54 and 55 and the carriage D again depressed while the thermally responsive member is in the position shown in Fig. 5, the latch lug 106 will engage the latch 104 and be held in its lowermost position. In such position the connector bar 121 connects the two contacts 117 and 119 together. The circuit through these contacts connects the heating elements 36 to the source of current cutting out the heater 85. As soon as this circuit is closed, the bread in the toasting ovens commences to toast. However, the thermally responsive member 72, not being heated through the heater 85 commences to cool. As the said thermally responsive member cools, the same releases the lever 92 permitting said lever to reach its normal position. After the thermally responsive member has cooled sufficiently it shifts lever 93 in a manner to free the latch 104 from the latch lug 106. Due to the play between the screws 101 and 102, the latch 103 reaches latching position before the latch 104 is disengaged. When the latch 104 becomes disengaged, the carriage D is raised by spring 68 until the said latch lug engages latch 103. At this position the connector bar 121 connects contacts 117 and 118 and the original circuit is again completed in which the heater 85 is energized. The strip of bi-metal 73 now deflects toward the left, as shown in Fig. 4, until it engages the screw 101 and moves latch 103 out of latching position. When this occurs, the carriage D is again released and ascends to its uppermost position in which the bread is remotely disposed from the heating elements and may be removed from the toaster. It will readily be comprehended that once the bi-metal has been heated that the same cannot be used for timing in the same cycle until the bi-metal has cooled. With the present invention the period in which the bi-metal cools is utilized in procuring the timing for the subsequent operation of the toaster. Since the time required to bring the strip of bi-metal to its maximum deflected position is considerably shorter when the bi-metal is partly heated than when cooled, it can readily be comprehended that any length of time can be procured for the second operation of the toaster by adjusting the time of cooling of the bi-metal strip by means of the screw 102. Likewise the length of time for the release of latch 103 of the latch lug 106 can be controlled by screw 101. In order to vary the degree of toasting, screw 78 may be adjusted which shifts the entire thermally responsive member so that it operates over a different range. This adjustment does not interfere with the relation between the timing for the first and successive slices and it will be found that bread toasted, as described, will have the same brownness regardless of the setting of the screw 78.

The advantages of my invention are manifest. The thermally responsive member is immediately useable for timing the second toasting operation. No time is lost in toasting since the toasting both occurs during the heating and cooling of the thermally responsive member. With my invention toasting is terminated during the heating cycle whereby more accurate timing can be procured. The invention is extremely simple and fool-proof. The carriage in its two positions operates the switch which energizes the heating elements and heater, thereby requiring no special parts.

Changes in the specific form of my invention, as herein disclosed, may be made within the scope of what is claimed without departing from the spirit of my invention.

Having described my invention, what I claim as new and desire to protect by Letters Patent is:

1. In a food cooking device, heating means, food shifting means for moving the food away from said heating means, said food shifting means being adapted to occupy several positions when the food is in proximity to the heating means, a thermally responsive member, a heater for heating said thermally responsive member to cause the same to deflect, means operated by said thermally responsive member during heating thereof and maintaining said food shifting means at one of said positions, means operated by said thermally responsive member during cooling thereof and maintaining said food shifting means at another of its positions and means controlled by said food shifting means when reaching one of said positions for energizing said heater.

2. In a food cooking device, heating means, food shifting means for moving the food away from said heating means, said food shifting means being adapted to occupy several positions when the food is in proximity to the heating means, a thermally responsive member, a heater for heating said thermally responsive member to cause the same to deflect, a latch operated by said thermally responsive member during heating thereof for maintaining said food shifting means in one of its positions, a latch operated by said thermally responsive member for maintaining said food shifting means during cooling of said thermally responsive member at another of said positions and means operated by said food shifting means when released by said second named latch for energizing said heater.

3. In a food cooker, heating means, food shifting means movable in an up and down direction for moving the food toward or from the heating means, said food shifting means being adapted to occupy a number of positions one above the other while the food is in proximity to the heating means, a timing device, means controlled by said timing device when the food shifting means is at one position for energizing said heating means for a predetermined length of time and means controlled by said timing device when the food shifting means is at another of its positions more elevated for energizing said heating means for a different length of time.

4. In a food cooker, heating means, food shifting means movable in an up and down direction for moving the food toward or from the heating means, said food shifting means being adapted to occupy a number of positions one above the other while the food is in proximity to the heating means, a thermally responsive member, a heater for heating said thermally responsive member, a latch operated by said thermally responsive member upon heating thereof for maintaining said food shifting means at its uppermost position, a second latch controlled by said thermally responsive member during cooling thereof for maintaining said food shifting means at its lowermost position, and means controlled by the positions of said food shifting means for energizing said heating means and heater.

5. In a food cooker, heating means, food shifting means movable in an up and down direction for moving the food toward or from the heating means, said food shifting means being adapted to occupy a number of positions one above the other while the food is in proximity to the heating means, a thermally responsive member, a heater for heating said thermally responsive member, a latch operated by said thermally responsive member upon heating thereof for maintaining said food shifting means at its uppermost position, a second latch controlled by said thermally responsive member during cooling thereof for maintaining said food shifting means at its lowermost position, means for causing said first latch to reassume latching position upon actuation of said second latch by said thermally responsive member, said second latch releasing control of said food shifting means to said first latch upon the thermally responsive member cooling to a predetermined temperature and means operated by said food shifting means when it reaches its uppermost position for energizing said heater.

6. In a food cooker, heating means, food shifting means movable in an up and down direction for moving the food toward or from the heating means, said food shifting means being adapted to occupy two positions, one above the other when the food is in proximity to the heating means, a thermally responsive member, a heater for heating said thermally responsive member, two latches, said thermally responsive member being positioned to move one of said latches into latching positon and to disengage the other latch upon being heated and to move the second latch into latching position and disengage the first latch upon being cooled, means movable with said shifting means for engagement with said latches, said latches and last named means maintaining the food shifting means in its respective positions and means operated by said food shifting means for energizing said heater when the food shifting means reaches its uppermost position.

7. In a food cooking device, heating means, food shifting means for moving the food away from said heating means, a thermally responsive member for controlling the movement of said food shifting means, a heater for heating said thermally responsive member, said food shifting means being adapted to occupy a number of different positions and movable from one of said positions to another under the control of said thermally responsive member, while the food is in proximity to the heating means, means operable at one of said positions for energizing said heating means and means operable upon movement of the food shifting means from one of said positions to another of said positions for energizing said heater.

8. In a food cooker, heating means, food shifting means for moving the food away from the heating means, a time controlled device for controlling the movement of said food shifting means and including a thermally responsive member, a heater for said thermally responsive member.

said food shifting means being adapted to occupy two positions and movable from one position to the other under control of the thermally responsive member while the food is in proximity to the heating means and switch means operated by said food shifting means for energizing said heater when the food shifting means is moved from one of its positions to the other.

9. In a food cooker operable for a cooking period, heating means, a thermally responsive member, a heater therefor, heat controlling means controlled by the thermally responsive member for controlling the operation of said heating means, said heat controlling means being rendered operative by said thermally responsive member when the temperature of said thermally responsive member at the initiation of the cooking period is below a certain degree of temperature to energize said heater during the entirety of said cooking period and rendered operative by said thermally responsive member when the temperature of said thermally responsive member at the initiation of the cooking period is above a certain degree of temperature to energize said heater for a portion only of the cooking period.

10. In a food cooker operable for a cooking period, heating means, a thermally responsive member, a heater therefor, variable means for energizing said heater during the entire cooking period or a portion only of the cooking period, and selective means controlled by the thermally responsive member at the initiation of the cooking cycle for controlling the operation of said variable means, said selective means controlling the operation of said heating means.

11. In a food cooker operable for a cooking period, heating means, a thermally responsive member, a heater therefor, two movable members operated by said thermally responsive member, one of said members being moved into operating position when the temperature of the thermally responsive member at the initiation of the cooking period is below a certain degree of temperature and the other of said movable members being moved into an operative position when the temperature of the thermally responsive member at the initiation of the cooking period is above a certain degree of temperature, means controlled by said first named movable member for energizing said heater for the entire cooking period and controlled by both said movable members for energizing said heater for a portion only of the cooking period, said last named means serving to control the operation of said heating means.

ROBERT SARDESON.